United States Patent
Bhogal et al.

(10) Patent No.: US 9,600,152 B2
(45) Date of Patent: *Mar. 21, 2017

(54) PROVIDING FEEDBACK FOR SCREEN SHARING

(71) Applicant: International Business Machines Corporation, Armonk, NY (US)

(72) Inventors: Kulvir S. Bhogal, Pflugerville, TX (US); Gregory J. Boss, Saginaw, MI (US); Rick A. Hamilton, II, Charlottesville, VA (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 517 days.

This patent is subject to a terminal disclaimer.

(21) Appl. No.: 14/077,333

(22) Filed: Nov. 12, 2013

(65) Prior Publication Data

US 2014/0075341 A1    Mar. 13, 2014

Related U.S. Application Data

(63) Continuation of application No. 13/323,696, filed on Dec. 12, 2011.

(51) Int. Cl.
*G06F 3/048* (2013.01)
*G06F 3/0484* (2013.01)
(Continued)

(52) U.S. Cl.
CPC ......... *G06F 3/0484* (2013.01); *G06Q 10/101* (2013.01); *H04L 65/403* (2013.01)

(58) Field of Classification Search
CPC ................. G06F 11/3438; G06F 17/30017
See application file for complete search history.

(56) References Cited

U.S. PATENT DOCUMENTS 5,311,422 A   5/1994 Loftin et al.
5,572,648 A   11/1996 Bibayan
(Continued)

FOREIGN PATENT DOCUMENTS

CN   101567858 A   4/2011
EP   0961197 A1   1/1999
(Continued)

OTHER PUBLICATIONS

Office Action, dated Aug. 15, 2014, regarding U.S. Appl. No. 14/082,123, 30 pages.
(Continued)

*Primary Examiner* — Jeffrey A Gaffin
*Assistant Examiner* — Justin Lee
(74) *Attorney, Agent, or Firm* — Yee & Associates, P.C.; Damion Josephs (57) ABSTRACT

A data processing system and computer program product for sharing displayed content. A content displayed on a source computer system is shared with a set of target computer systems, wherein the content is displayed on a target display on each target computer system in the set of target computer systems. In response to a change in the content displayed on the source computer system, a progress in displaying the change in the content on the target display on the each target computer system in the set of target computer systems is identified. An indication of the progress in displaying the change in the content on the target display on the each target computer system in the set of target computer systems is generated at the source computer system.

9 Claims, 5 Drawing Sheets

(51) Int. Cl.
*G06Q 10/10* (2012.01)
*H04L 29/06* (2006.01)

(56) References Cited

U.S. PATENT DOCUMENTS

| | | | |
|---|---|---|---|
| 5,634,018 | A | 5/1997 | Tanikoshi et al. |
| 5,799,292 | A | 8/1998 | Hekmatpour |
| 5,864,819 | A | 1/1999 | De Armas et al. |
| 6,052,676 | A | 4/2000 | Hekmatpour |
| 6,059,842 | A | 5/2000 | Dumarot et al. |
| 6,161,137 | A | 12/2000 | Ogdon et al. |
| 6,292,174 | B1 | 9/2001 | Mallett et al. |
| 6,301,462 | B1 | 10/2001 | Freeman et al. |
| 6,325,632 | B1 | 12/2001 | Chao et al. |
| 6,411,796 | B1 | 6/2002 | Remschel |
| 6,654,032 | B1 | 11/2003 | Zhu et al. |
| 6,694,482 | B1 | 2/2004 | Arellano et al. |
| 6,714,778 | B2 | 3/2004 | Nykanen et al. |
| 6,892,049 | B2 | 5/2005 | Phalp et al. |
| 6,928,461 | B2 | 8/2005 | Tuli |
| 6,973,418 | B1 | 12/2005 | Kirshenbaum |
| 7,007,235 | B1 | 2/2006 | Hussein et al. |
| 7,103,836 | B1 | 9/2006 | Nakamura et al. |
| 7,147,475 | B2 | 12/2006 | Sudo |
| 7,203,708 | B2 | 4/2007 | Liu et al. |
| 7,216,002 | B1 | 5/2007 | Anderson |
| 7,275,116 | B1 | 9/2007 | Hanmann et al. |
| 7,340,534 | B2 | 3/2008 | Cameron et al. |
| 7,360,166 | B1 | 4/2008 | Krzanowski |
| 7,386,801 | B1 | 6/2008 | Horvitz et al. |
| 7,454,386 | B2 | 11/2008 | Chakraborty |
| 7,490,169 | B1 | 2/2009 | Ogdon et al. |
| 7,530,020 | B2 | 5/2009 | Szabo |
| 7,620,621 | B2 | 11/2009 | Fuselier et al. |
| 7,620,895 | B2 | 11/2009 | Adkins et al. |
| 7,644,144 | B1 | 1/2010 | Horvitz et al. |
| 7,660,604 | B2 | 2/2010 | Ueda |
| 7,672,873 | B2 | 3/2010 | Kindig et al. |
| 7,743,135 | B2 | 6/2010 | Azuma |
| 7,747,719 | B1 | 6/2010 | Horvitz et al. |
| 7,757,114 | B2 | 7/2010 | Watanabe |
| 7,801,896 | B2 | 9/2010 | Szabo |
| 7,853,900 | B2 | 12/2010 | Nguyen et al. |
| 7,860,962 | B2 | 12/2010 | White et al. |
| 7,925,616 | B2 | 4/2011 | Hurwood et al. |
| 8,090,794 | B1 | 1/2012 | Kilat et al. |
| 8,108,780 | B2 | 1/2012 | Abernethy et al. |
| 8,225,229 | B2 | 7/2012 | Thorn et al. |
| 8,271,631 | B1 | 9/2012 | Horvitz et al. |
| 8,312,385 | B2 | 11/2012 | Bier |
| 8,527,588 | B2 | 9/2013 | Beck et al. |
| 8,548,848 | B1 | 10/2013 | Shaw et al. |
| 8,597,031 | B2 | 12/2013 | Cohen et al. |
| 8,602,794 | B2 | 12/2013 | Cohen |
| 8,903,768 | B2 | 12/2014 | Bhogal et al. |
| 8,935,423 | B1 | 1/2015 | Johnson et al. |
| 9,086,788 | B2 | 7/2015 | Bhogal et al. |
| 2002/0083092 | A1 | 6/2002 | Simpson |
| 2002/0140719 | A1 | 10/2002 | Amir et al. |
| 2002/0184312 | A1 | 12/2002 | Chen et al. |
| 2003/0211856 | A1 | 11/2003 | Zilliacus |
| 2003/0222876 | A1 | 12/2003 | Giemborek et al. |
| 2003/0222890 | A1 | 12/2003 | Salesin et al. |
| 2004/0044691 | A1 | 3/2004 | Wajda |
| 2004/0049793 | A1 | 3/2004 | Chou |
| 2004/0128624 | A1 | 7/2004 | Arellano |
| 2004/0253991 | A1 | 12/2004 | Azuma |
| 2005/0004885 | A1 | 1/2005 | Pandian et al. |
| 2005/0132045 | A1 | 6/2005 | Hornback, Jr. et al. |
| 2005/0138540 | A1 | 6/2005 | Baltus et al. |
| 2005/0197906 | A1 | 9/2005 | Kindig et al. |
| 2006/0002315 | A1 | 1/2006 | Theurer et al. |
| 2006/0014546 | A1 | 1/2006 | Bodin et al. |
| 2006/0041686 | A1 | 2/2006 | Caspi et al. |
| 2006/0056304 | A1 | 3/2006 | Moore |
| 2006/0066503 | A1 | 3/2006 | Sampsell et al. |
| 2006/0085449 | A1 | 4/2006 | Sattler et al. |
| 2006/0136828 | A1 | 6/2006 | Asano |
| 2006/0184508 | A1 | 8/2006 | Fuselier et al. |
| 2006/0238652 | A1 | 10/2006 | Parker et al. |
| 2006/0288023 | A1 | 12/2006 | Szabo |
| 2006/0288074 | A1 | 12/2006 | Rosenberg |
| 2007/0055939 | A1 | 3/2007 | Furlong et al. |
| 2007/0127879 | A1 | 6/2007 | Frank et al. |
| 2007/0132727 | A1 | 6/2007 | Garbow et al. |
| 2007/0283403 | A1 | 12/2007 | Eklund et al. |
| 2007/0288584 | A1 | 12/2007 | Tsai et al. |
| 2008/0005233 | A1 | 1/2008 | Cai et al. |
| 2008/0018582 | A1 | 1/2008 | Yang et al. |
| 2008/0034320 | A1 | 2/2008 | Ben-Shachar et al. |
| 2008/0133769 | A1 | 6/2008 | Salesky et al. |
| 2008/0154907 | A1 | 6/2008 | Prasad et al. |
| 2008/0214210 | A1 | 9/2008 | Rasanen et al. |
| 2008/0246775 | A1 | 10/2008 | Fisher et al. |
| 2008/0275871 | A1 | 11/2008 | Berstis et al. |
| 2008/0288992 | A1 | 11/2008 | Usman et al. |
| 2008/0310722 | A1* | 12/2008 | Daniels ............... G06K 9/00 382/182 |
| 2009/0012821 | A1 | 1/2009 | Besson et al. |
| 2009/0013045 | A1 | 1/2009 | Maes et al. |
| 2009/0055342 | A1 | 2/2009 | Gong et al. |
| 2009/0082051 | A1 | 3/2009 | Ruotsi |
| 2009/0226152 | A1 | 9/2009 | Hanes |
| 2009/0228211 | A1 | 9/2009 | Rasanen et al. |
| 2009/0300020 | A1 | 12/2009 | Chen et al. |
| 2009/0307168 | A1 | 12/2009 | Bockius et al. |
| 2009/0313329 | A1 | 12/2009 | Agrawal et al. |
| 2010/0010921 | A1 | 1/2010 | Liu et al. |
| 2010/0028846 | A1 | 2/2010 | Cohen et al. |
| 2010/0131523 | A1 | 5/2010 | Yu et al. |
| 2010/0153314 | A1 | 6/2010 | Forman |
| 2010/0153413 | A1 | 6/2010 | Mok et al. |
| 2010/0198654 | A1 | 8/2010 | Kumar et al. |
| 2010/0205041 | A1 | 8/2010 | Rathod et al. |
| 2010/0235285 | A1 | 9/2010 | Hoffberg |
| 2010/0293226 | A1* | 11/2010 | Beck ............... G06F 11/3409 709/204 |
| 2010/0332242 | A1 | 12/2010 | Kamar et al. |
| 2011/0029482 | A1 | 2/2011 | Gimsom et al. |
| 2011/0029658 | A1 | 2/2011 | Werth et al. |
| 2011/0043652 | A1 | 2/2011 | King et al. |
| 2011/0078532 | A1 | 3/2011 | Vonog et al. |
| 2011/0078615 | A1 | 3/2011 | Bier |
| 2011/0085211 | A1 | 4/2011 | King et al. |
| 2011/0087679 | A1 | 4/2011 | Rosato et al. |
| 2011/0173256 | A1 | 7/2011 | Khalatian |
| 2011/0173266 | A1 | 7/2011 | Ohashi et al. |
| 2011/0195667 | A1 | 8/2011 | Hassan et al. |
| 2011/0258574 | A1 | 10/2011 | Adams |
| 2011/0295551 | A1 | 12/2011 | Rasanen et al. |
| 2011/0302524 | A1* | 12/2011 | Forstall ............ G06F 17/30905 715/781 |
| 2011/0314387 | A1 | 12/2011 | Gold et al. |
| 2012/0004960 | A1 | 1/2012 | Ma et al. |
| 2012/0016770 | A1 | 1/2012 | Thomas |
| 2012/0050320 | A1 | 3/2012 | Verbeque et al. |
| 2012/0054281 | A1 | 3/2012 | Westmoreland |
| 2012/0084866 | A1 | 4/2012 | Stolfo |
| 2012/0096014 | A1 | 4/2012 | Davids |
| 2012/0124456 | A1 | 5/2012 | Perez et al. |
| 2012/0182384 | A1 | 7/2012 | Anderson et al. |
| 2013/0091409 | A1 | 4/2013 | Jeffrey |
| 2013/0151624 | A1 | 6/2013 | Bhogal et al. |
| 2013/0151973 | A1 | 6/2013 | Bhogal et al. |
| 2013/0151976 | A1 | 6/2013 | Bhogal et al. |
| 2013/0159021 | A1 | 6/2013 | Felsher |
| 2013/0159822 | A1 | 6/2013 | Grossman et al. |
| 2013/0159874 | A1 | 6/2013 | Bhogal et al. |
| 2013/0159880 | A1 | 6/2013 | Bhogal et al. |
| 2013/0326576 | A1 | 12/2013 | Zhang et al. |
| 2014/0075331 | A1 | 3/2014 | Bhogal et al. |
| 2014/0082518 | A1 | 3/2014 | Bhogal et al. |

(56) References Cited

U.S. PATENT DOCUMENTS

| | | | |
|---|---|---|---|
| 2014/0100927 | A1 | 4/2014 | Bhogal et al. |
| 2014/0101253 | A1 | 4/2014 | Bhogal et al. |
| 2014/0129520 | A1 | 5/2014 | Bhogal et al. |

FOREIGN PATENT DOCUMENTS

| | | | |
|---|---|---|---|
| JP | 11327523 | A | 11/1999 |
| JP | 2005348262 | A | 12/2005 |
| JP | 2006268638 | A | 10/2006 |
| JP | 2006338531 | A | 12/2006 |
| JP | 2008234072 | A | 10/2008 |
| JP | 2009205278 | A | 9/2009 |
| JP | 2011100270 | A | 5/2011 |
| WO | 0198888 | A2 | 12/2001 |
| WO | 0209086 | A1 | 1/2002 |
| WO | 02054192 | A2 | 7/2002 |
| WO | 2006127430 | A1 | 11/2006 |
| WO | 2011161735 | A1 | 12/2011 |

OTHER PUBLICATIONS

Office Action, dated Sep. 11, 2014, regarding U.S. Appl. No. 13/323,696, 28 pages.

Office Action, dated Aug. 15, 2014, regarding U.S. Appl. No. 13/325,950, 35 pages.

Notice of Allowance, dated Jul. 29, 2014, regarding U.S. Appl. No. 13/668,294, 19 pages.

Notice of Allowance, dated Apr. 24, 2015, regarding U.S. Appl. No. 13/326,007, 14 pages.

Notice of Allowance, dated May 8, 2015, regarding U.S. Appl. No. 14/082,123, 14 pages.

Notice of Allowance, dated Apr. 28, 2015, regarding U.S. Appl. No. 14/082,128, 14 pages.

Office Action, dated May 21, 2015, regarding U.S. Appl. No. 13/323,696, 28 pages.

Notice of Allowance, dated May 12, 2015, regarding U.S. Appl. No. 13/325,950, 14 pages.

Office Action, dated Oct. 13, 2015, regarding U.S. Appl. No. 13/323,711, 59 pages.

Final Office Action, dated Oct. 28, 2015, regarding U.S. Appl. No. 13/323,696, 30 pages.

Office action regarding U.S. Appl. No. 13/668,294, dated Feb. 28, 2014, 15 pages.

Office action regarding U.S. Appl. No. 13/668,294, dated Dec. 27, 2013, 15 pages.

Notice of allowance dated Apr. 22, 2014, regarding U.S. Appl. No. 13/323,681, 10 pages.

Office action dated Nov. 27, 2013, regarding U.S. Appl. No. 13/323,681, 20 pages.

Architecture for a Dynamic Information Area Control, IBM Technical Disclosure Bulletin, IBM Corp. New York, NY, 37(10):245-246, Oct. 1, 1994.

Au et al., "Netscape Communicator's Collapsible Toolbars," In: CHI '98, Human Factors in Computing Systems, Conference Proceedings, ACM Press, New York, NY, pp. 81-86, Apr. 18, 1998.

Reimer et al., "Presence-Based, Context-Sensitive Real-Time Collaboration (RTC)—Research Directions for a New Type of eCollaboration System," 19th Bled eConference, eValues, Bled, Slovenia, Jun. 5-7, 2006, 16 pages.

Sato et al., "XFIG Version 3.2 Patchlevel 2 Users Manual," 4 pages.http://www.math.unm.edu/xfig/index.html, Jul. 2, 1998.

Bhogal et al., "Customizing a Presentation Based on Preferences of an Audience," U.S. Appl. No. 14/076,584, filed Nov. 11, 2013, 23 pages.

Bhogal et al., "Variable Refresh Rates for Portions of Shared Screens," U.S. Appl. No. 14/082,123, filed Nov. 16, 2013, 35 pages.

Bhogal et al., "Dynamic Screen Sharing for Optimal Performance," U.S. Appl. No. 14/082,128, filed Nov. 16, 2013, 31 pages.

"Create Custom Shows within a Presentation in PowerPoint," Microsoft Corporation, http://www.office.microsoft.com/en-us/powerpoint-help/creat-custom-shows-within-a-presentation, accessed Mar. 12, 2012, 1 page.

Porst, "X.5 iChat," Quarter Life Crisis—The World According to Sven-S. Porst, http://earthlingsoft.net/ssp/blog/2007/12/x5_chat, accessed Mar. 12, 2012, 20 pages.

Yun, "Manage and Monitor Meeting Bandwidth," Acrobat® Connect Pro User Community, http://www.connectusers.com/tutorials/2009/03/connection_status/index.php?format, accessed Mar. 12, 2012, 5 pages.

Office Action, dated Feb. 27, 2015, regarding U.S. Appl. No. 13/326,007, 40 pages.

Final Office Action, dated Feb. 27, 2015, regarding U.S. Appl. No. 14/082,123, 20 pages.

Office Action, dated Mar. 6, 2015, regarding U.S. Appl. No. 14/082,128, 40 pages.

Notice of Allowance, dated Mar. 13, 2015, regarding U.S. Appl. No. 14/082,132, 51 pages.

Final Office Action, dated Feb. 12, 2015, regarding U.S. Appl. No. 13/323,696, 25 pages.

Final Office Action, dated Feb. 26, 2015, regarding U.S. Appl. No. 13/325,950, 19 pages.

Office Action, dated Jul. 15, 2016, regarding U.S. Appl. No. 13/323,696, 36 pages.

Office Action, dated Apr. 8, 2016, regarding U.S. Appl. No. 14/076,584, 58 pages.

Final Office Action, dated Apr. 27, 2016, regarding U.S. Appl. No. 13/323,711, 30 pages.

"Presentation slide different audience," Bing search, dated Apr. 17, 2016, 2 pages.

"Slide presentation target audience," Bing search, dated Apr. 17, 2016, 3 pages.

Notice of Allowance, dated Oct. 13, 2016, regarding U.S. Appl. No. 14/076,584, 22 pages.

Notice of Allowance, dated Oct. 26, 2016, regarding U.S. Appl. No. 13/323,696, 8 pages.

Office Action, dated Dec. 27, 2016, regarding U.S. Appl. No. 13/323,711, 34 pages.

* cited by examiner

PROVIDING FEEDBACK FOR SCREEN SHARING

This application is a continuation of application Ser. No. 13/323,696, filed Dec. 12, 2011.

BACKGROUND

1. Field

The present disclosure relates generally to screen sharing and in particular to a system for sharing displayed content. Still more particularly, the present disclosure relates to a system for identifying progress in displaying a change in content on target displays after the change in content occurs on a source display.

2. Description of the Related Art

Screen sharing is often used to share content displayed on one computer system with one or more additional computer systems. For example, if an instructor wants to present content to a group of remotely located students, the instructor may use a screen sharing application that allows content on the instructor's computer screen to be sent to computer screens of the remotely located students.

Since a certain amount of time is required for content to be transmitted from a source computer system to a target computer system, any changes to content displayed on the source computer system are delayed by an amount of time. Moreover, one target system with a slow bandwidth connection and slow processor speed can take longer to display changes in content than another target system with fast bandwidth and processor speed. Consequently, a presenter at a source computer system may have to obtain verbal feedback or textual feedback from users of each target computer system in order to determine when changes on the source computer system have been reflected on each target computer system.

SUMMARY

The different illustrative embodiments provide a data processing system, and computer program product for sharing displayed content. A content displayed on a source computer system is shared with a set of target computer systems, wherein the content is displayed on a target display on each target computer system in the set of target computer systems. In response to a change in the content displayed on the source computer system, a progress in displaying the change in the content on the target display on the each target computer system in the set of target computer systems is identified. An indication of the progress in displaying the change in the content on the target display on the each target computer system in the set of target computer systems is generated at the source computer system.

DETAILED DESCRIPTION

As will be appreciated by one skilled in the art, aspects of the illustrative embodiments may be embodied as a system, method or computer program product. Accordingly, aspects of the illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electro-magnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of methods, apparatus (systems) and computer program products according to illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which are processed on the computer or other programmable apparatus provide processes for implementing the functions/acts specified in the flowchart and/or block diagram block or blocks.

The different illustrative embodiments recognize and take into that account that screen sharing is often performed between a source computer system and one or more target computer system with different screen sharing capabilities. The different illustrative embodiments recognize and take into account that the progress of sharing displayed content between a source computer system and one or more target computer systems may be desirable.

Thus, the different illustrative embodiments provide method, data processing system, and computer program product for sharing displayed content. A content displayed on a source computer system is shared with a set of target computer systems, wherein the content is displayed on a target display on each target computer system in the set of target computer systems. In response to a change in the content displayed on the source computer system, a progress in displaying the change in the content on the target display on the each target computer system in the set of target computer systems is identified. An indication of the progress in displaying the change in the content on the target display on the each target computer system in the set of target computer systems is generated at the source computer system. As used herein, "set of" means one or more. For example, set of target computer systems means one or more target computer systems.

Figure 1:
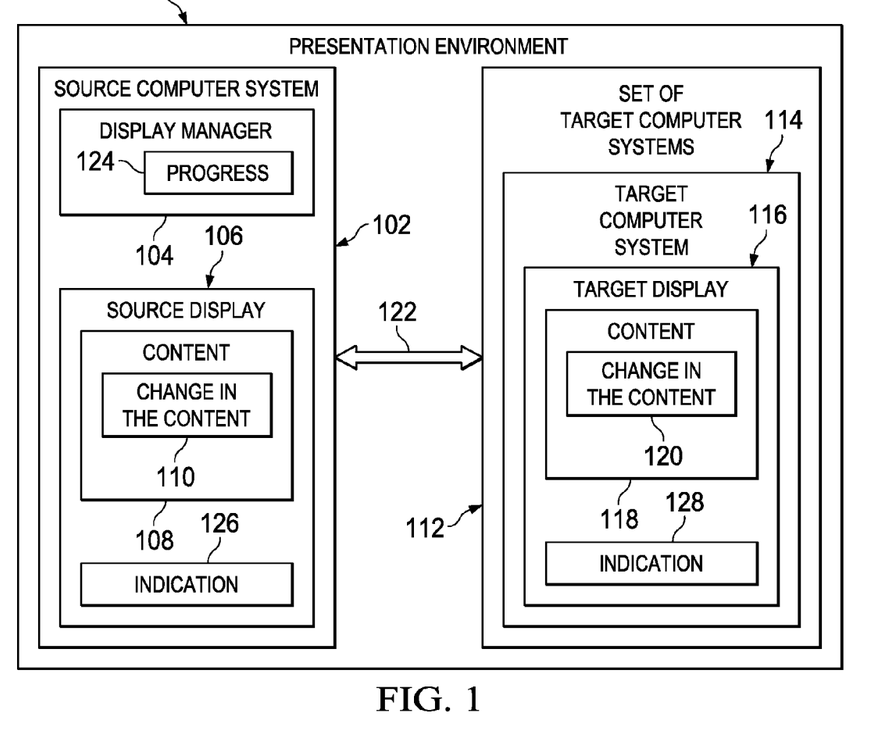
FIG. 1 is an illustration of a presentation environment in which illustrative embodiments may be implemented.

With reference to FIG. 1, presentation environment 100 is depicted in accordance with an illustrative embodiment. As depicted, presentation environment 100 is an example of components in which the illustrative embodiments may be implemented.

In the depicted example, computer system 102 comprises display manager 104 and source display 106. Source display 106 is a device such as a screen, monitor, panel, graphical display, and any device suitable for displaying content 108. Content 108 is displayed on source display 106.

In the illustrative examples, content 108 may take various forms. For example, content 108 may be letters, numbers, characters, pixels, shapes, colors, photos, videos, icons, and any form of information suitable for being displayed on source display 106. Change in the content 110 is a difference between content 108 displayed at a current time as compared to content 108 displayed at a previous time. In some illustrative examples, the previous time can be a specified time. In some illustrative examples, the previous time can be selected by subtracting a time interval suitable for determining change in content 110. For example, the previous time can be specified as 1 millisecond before the current time.

In the depicted example, set of target computer systems 112 comprises target computer system 114. Target computer system 114 comprises target display 116. Target display 116 is a device such as a screen, monitor, panel, graphical display, and any device suitable for displaying content 118. Content 118 is displayed on target display 116. In the depicted example, content 108 is shared with set of target computer systems 112 to form content 118. Similarly, change in content 110 is shared with set of target computer systems 112 to form change in the content 120.

Sharing is sending information, such as content 108, from source computer system 102 to set of target computer systems 112 via a communication link 122. Communication link 122 can be wire, wireless, and a combination of wire and wireless communication links for transmitting information from source computer system 102 to set of target computer systems 112 and for transmitting information from set of target computer systems 112 to source computer system 102.

In the depicted example, responsive to source computer system 102 displaying change in the content 110, display manager 104 sends information comprising change in the content 110 to set of target computer systems and target computer system 114 begins to display change in the content 110 as change in the content 120. In the depicted example, responsive to source computer system 102 displaying change in the content 110, display manger 104 identifies progress 124 in displaying change in the content 120. In the depicted example, display manager 104 generates indication 126 of the progress in displaying change in the content 120. In the depicted example, indication 126 is displayed on source display. In the depicted example, indication 128 of the progress in displaying change in the content 120 is also displayed on target display.

In some illustrative examples, the above process is performed for each additional target computer system in set of target computer systems 112. For example, content 108 is shared with one or more additional target computer systems in set of target computer systems 112 and content 108 is displayed on a target display on each of the one or more additional target computer systems in set of target computer systems 112. Responsive to change in the content 110, display manager identifies a progress in displaying change in content 110 on the target display on each of the one or more additional target computer systems in set of target computer systems 112.

Display manager generates an indication of the progress in displaying change in the content 110 on the target display on each of the one or more additional target computer systems in set of target computer systems 112. In some illustrative examples, display manager 104 displays an indication of the progress in displaying change in the content 110 on the target display on each of the one or more additional target computer systems in set of target computer systems 112 on source display.

Therefore, the progress in displaying change in the content 110 on the target display for each target computer system can be monitored and compared with the progress in displaying change in the content 110 of each of the other target computer systems. In some illustrative examples, display manager 104 displays summary information and statistics for each target system in set of target computer systems 112 associated with the progress in displaying change in content 110 on the target display on each of the one or more additional target computer systems in set of target computer systems 112.

In some illustrative examples, additional indicators may be used to provide feedback for the progress in displaying change in the content 110 for each of the other target computer systems. For example, colors and icons can be used. A red color can mean that displaying change in the content 110 has not started, a yellow color can mean displaying change in the content 110 has started but is not complete, and a green color can mean displaying change in the content 110 is complete.

In some illustrative examples, each target computer system in set of target computer systems 112 displays an indication of the progress in displaying change in the content 108 on the corresponding target computer system. In some illustrative examples, each target computer system in set of target computer systems 112 displays an indication of the progress in displaying change in the content 108 on each target computer system in set of target computer systems 112. Therefore, the progress in displaying change in the content 110 on the target display for each target computer system can be monitored and compared with the progress in displaying change in the content 110 of each of the other target computer systems by a user of a target computer system.

In some illustrative examples, content 108 is displayed on a portion of source display 106. In some illustrative examples, identifying progress 124 in displaying change in the content 110 on each target display of each target computer system in set of target computer systems 112 includes identifying an expected amount of time until change in the content 110 is displayed on each target computer system in set of target computer systems 112. In some illustrative examples, indication 126 displays the expected amount of time until change in the content 110 is displayed on each target computer system in set of target computer systems 112. In some illustrative examples, an indication of the expected amount of time until change in the content 110 is displayed on each target computer system in set of target computer systems 112 is also displayed on a display on each target computer system in set of target computer systems 112. In some illustrative examples, indication 126 displays the overall expected amount of time until change in the content 110 is displayed on all target computer systems in set of target computer systems 112.

In some illustrative examples, display manager 104 determines a set of actions that are required to display change in the content 110 on each target display on each target computer system in set of target computer systems 112 within a specified amount of time. For example, a user may set a goal time of 1 second for each target computer system and display manager 104 may list a set of actions, such as reducing resolution for one or more target displays and changing a screen size for one or more target displays. In some illustrative examples, display manager 104 displays the set of actions on source computer system 102. Display manager 104 may display set of actions on source display 106.

In some illustrative examples, responsive to display manager 104 determining that a threshold number of set of target systems 112 has displayed change in the content 110, display manager 104 generates and displays indication 126 on source computer system 102 that the threshold number of target systems has displayed change in the content 110. For example, if the threshold number is 3, then display manager 104 will display indication 126 in response to 3 of the set of target systems 112 displaying change in the content 110. In some illustrative examples, display manager 104 displays indication 126 on source display 106. Indication 126 can be a color, graphical content, sound, number, icon, pixels, and any other indication suitable for indicating that a threshold number of set of target systems 112 has displayed change in the content 110. For example, if indication 126 is green, then the threshold number of set of target systems 112 has displayed change in the content 110.

In some illustrative examples, responsive to display manager 104 determining that an identified portion of set of target systems 112 has displayed change in the content 110, display manager 104 generates and displays an indication on source computer system 102 that the identified portion of target systems has displayed change in the content 110. For example, if 3 target systems are identified, then display manager 104 will display the indication in response to the 3 target systems displaying change in the content 110. In some illustrative examples, display manager 104 displays the indication on source display 106. Indication 126 can be a color, graphical content, sound, number, icon, pixels, and any other indication suitable for indicating that an identified portion of set of target systems 112 has displayed change in the content 110. For example, if indication 126 is green, then the identified portion of set of target systems 112 has displayed change in the content 110. In some illustrative examples, the identified portion of target systems is mandatory. For example, identified portion of target systems can be used by critical members of a group and critical members of a meeting. The portion of target systems that are not identified may be optional members for the group and optional members for the meeting.

Figure 2:
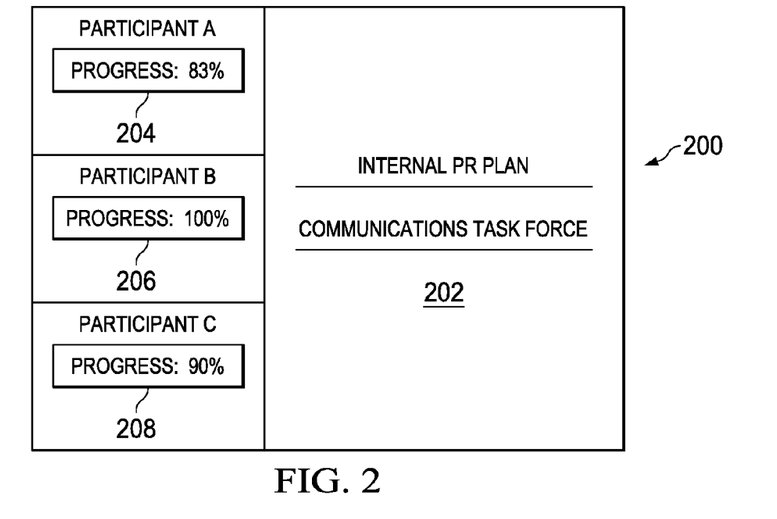
FIG. 2 is an illustration of a source display in accordance with an illustrative embodiment.

Turning now to FIG. 2, an illustration of a source display 200 is depicted in accordance with an illustrative embodiment. Source display 200 is an example of source display 106 of FIG. 1. Content 202 is an example of content 108 of FIG. 1. Indication 204, indication 206, and indication 208 are each an example of indication 126 of FIG. 1.

In the depicted example, indication 204 shows that progress in displaying change in the content 110 on a target display of Participant A is 83%. Indication 206 shows that progress in displaying change in the content 110 on a target display of Participant B is 100%. Indication 208 shows that progress in displaying change in the content 110 on a target display of Participant C is 90%.

The illustration of presentation environment 100 in FIG. 1 and source display 200 in FIG. 2 is not meant to imply physical or architectural limitations to the manner in which an advantageous embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an advantageous embodiment. For example, source display 126 may be remotely located from source computer system 102. In some illustrative examples, target display 116 may be remotely located from target computer system 114.

Figure 3:
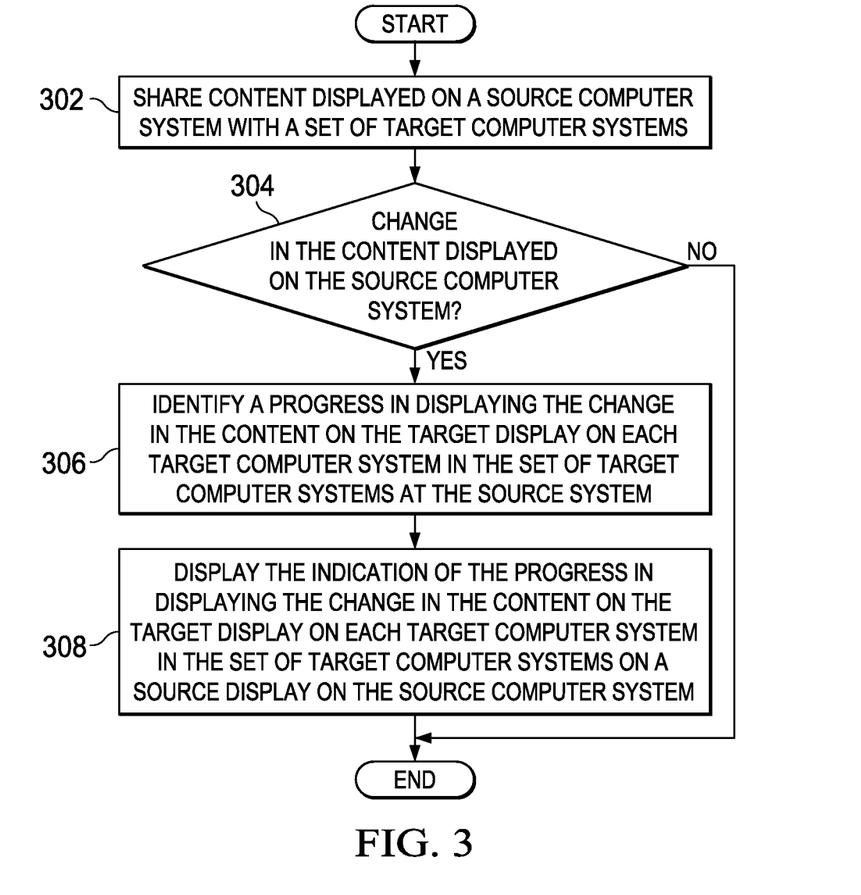
FIG. 3 is an illustration of a flowchart of a process for sharing displayed content in accordance with an illustrative embodiment

With reference now to FIG. 3, an illustration of a flowchart of a process for sharing displayed content is depicted in accordance with an illustrative embodiment. The process illustrated in FIG. 3 may be implemented in a presentation environment, such as presentation environment 100 in FIG. 1. In the depicted example, the process is implemented by display manager 104 of FIG. 1.

The process begins by sharing content 108 displayed on a source computer system 102 with a set of target computer systems 112 (step 302). In the depicted example, content 108 is displayed on a target display 116 on each target computer system 114 in the set of target computer systems 112.

The process then determines whether there is a change in the content 108 displayed on the source computer system 102 (step 304). If there is not change in the content 108 displayed on the source computer system 102, the process terminates. If there is a change in the content 108 displayed on the source computer system 102, the process identifies a progress 124 in displaying the change in the content 120 on each target computer system 114 in the set of target computer systems 112 (step 306). The process then displays the indication 126 of the progress 124 in displaying the change in the content 120 on the target display 116 on each target computer system 114 in the set of target computer systems 112 on a source display 106 on the source computer system 102 (step 308). Thereafter, the process terminates.

Figure 4:
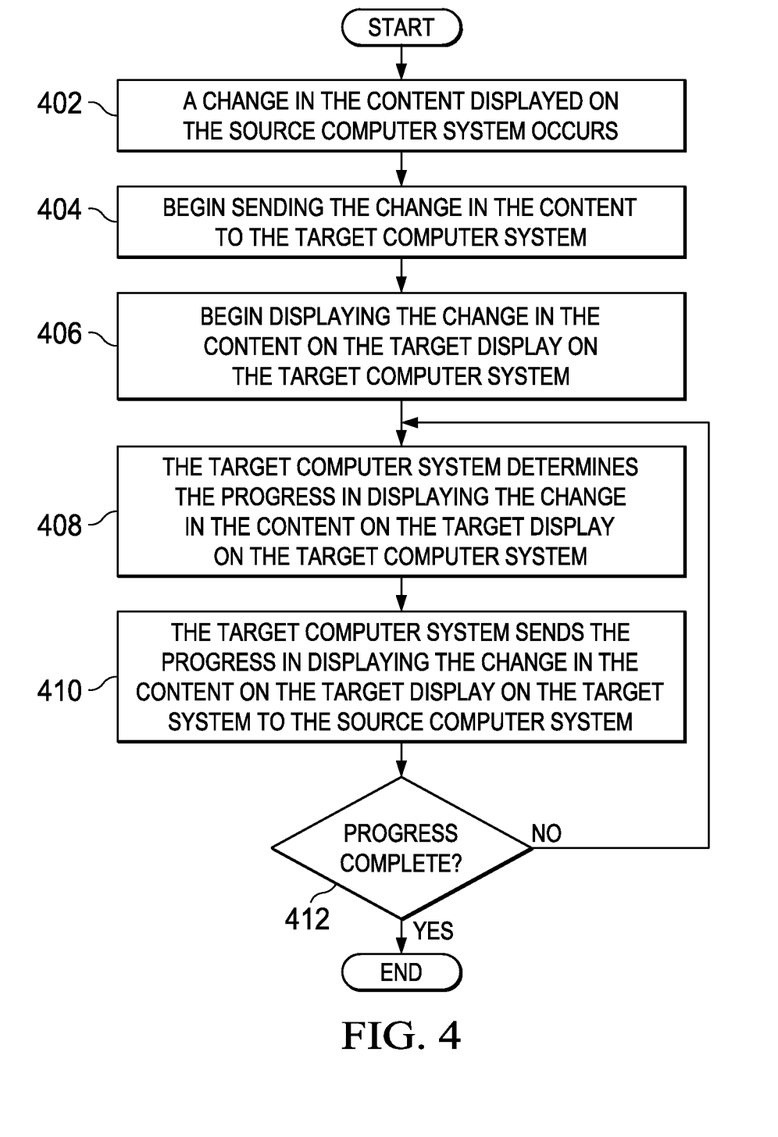
FIG. 4 is an illustration of a flowchart of a process for sharing displayed content in accordance with an illustrative embodiment

With reference now to FIG. 4, an illustration of a flowchart of a process for sharing displayed content is depicted in accordance with an illustrative embodiment. The process illustrated in FIG. 4 may be implemented in a presentation environment, such as presentation environment 100 in FIG. 1. In the depicted example, the process is implemented by display manager 104 of FIG. 1.

The process begins when a change in the content 110 displayed on a source computer system 102 occurs (step 402). In the depicted example, content 108 is displayed on a target display 116 on a target computer system 114 in the set of target computer systems 112.

The process then begins sending the change in the content 110 to a target computer system 114 (step 404). In some illustrative examples, sending the change in the content 110 comprises sending information comprising change in the content 110 from source computer system 102 to set of target computer systems 112 via a communication link 122. The process then begins displaying the change in the content 120 on the target display 116 on the target computer system 114 (step 406).

The target computer system 114 determines the progress 124 in displaying the change in the content 120 on the target display 116 on the target computer system 114 (step 408). The target computer system 114 sends to the source computer system 102 information that includes the progress in displaying the change in the content 120 on the target display 116.

The process then determines whether the progress in displaying change in the content 120 is complete (step 304). If the progress 124 is complete, the process terminates. If the progress 124 is not complete, the process returns to step 408. Thereafter, the process terminates.

Figure 5:
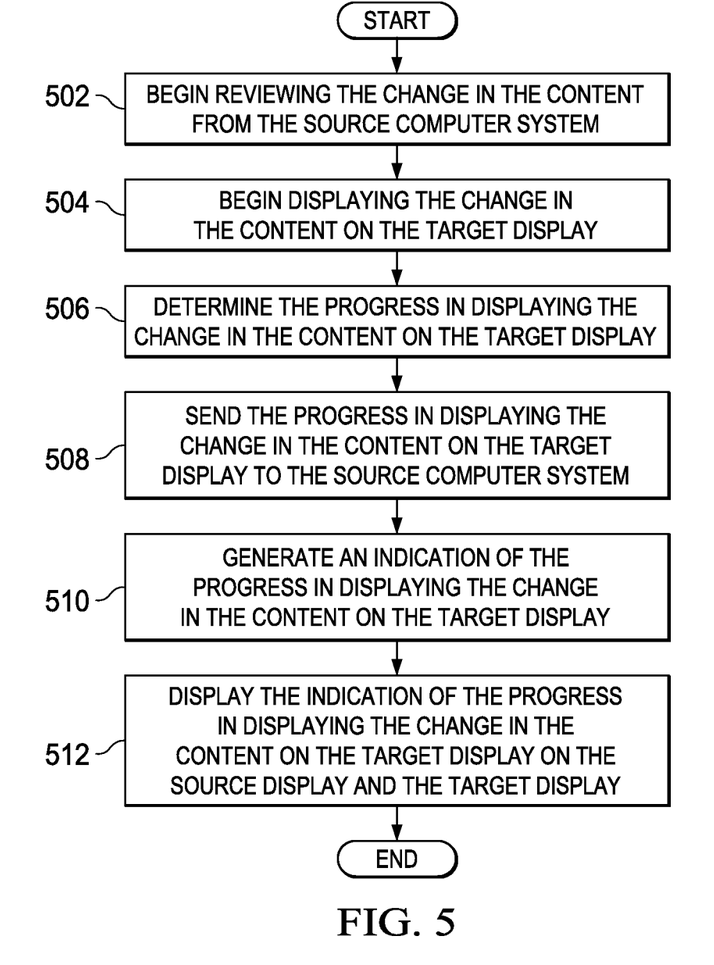
FIG. 5 is an illustration of a flowchart of a process for sharing displayed content in accordance with an illustrative embodiment.

With reference now to FIG. 5, an illustration of a flowchart of a process for sharing displayed content is depicted in accordance with an illustrative embodiment. The process illustrated in FIG. 5 may be implemented in a presentation environment, such as presentation environment 100 in FIG. 1. In the depicted example, the process is implemented by display manager 104 of FIG. 1.

The process begins receiving the change in the content 110 from the source computer system 102 at a target computer system 114 (step 502). In the depicted example, content 108 is displayed on a target display 116 on the target computer system 114 in the set of target computer systems 112. The process begins displaying the change in the content 120 on the target display 116 (step 504). The process then determines the progress 124 in displaying the change in the content 120 on the target display (step 506).

The process then sends information that includes the progress 124 in displaying the change in the content 120 on the target display 116 to the source computer system 102 (step 508). The process then generates an indication 126 of the progress 124 in displaying the change in the content 120 on the target display 116 (step 510). At step 512, the process displays an indication 126 of the progress 124 in displaying the change in the content 108 on the target display 116 on the source display 126 and the target display 116. Thereafter, the process terminates.

Figure 6:
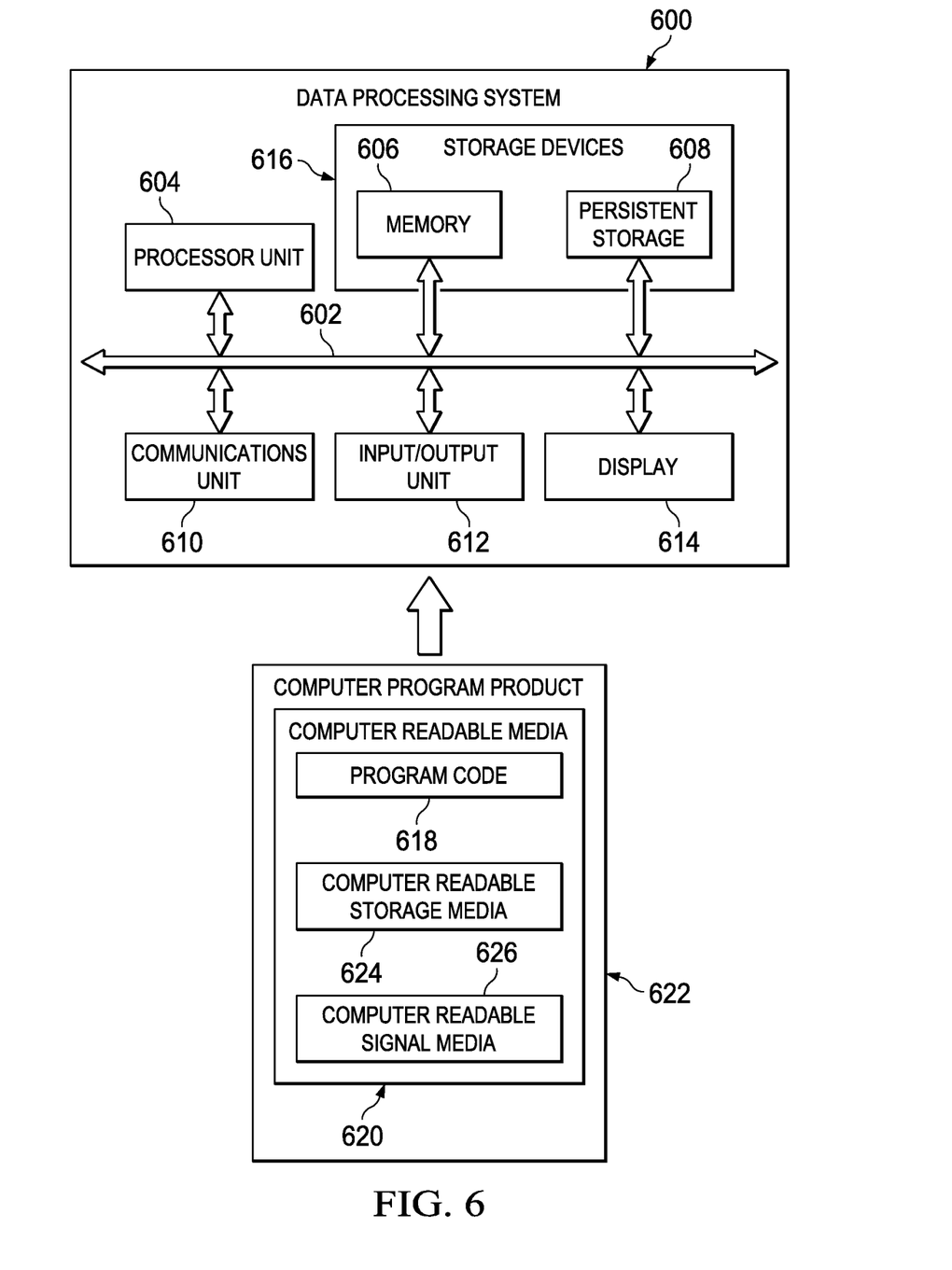
FIG. 6 is an illustration of a data processing system in accordance with an illustrative embodiment.

Turning now to FIG. 6, an illustration of a data processing system is depicted in accordance with an illustrative embodiment. In this illustrative example, data processing system 600 includes communications fabric 602, which provides communications between processor unit 604, memory 606, persistent storage 608, communications unit 610, input/output (I/O) unit 612, and display 614. Data processing system 600 is an example of one implementation for source computer system 102 and target computer system 114 in FIG. 1.

Processor unit 604 serves to run instructions for software that may be loaded into memory 606. Processor unit 604 may be a number of processors, a multi-processor core, or some other type of processor, depending on the particular implementation. A number, as used herein with reference to an item, means one or more items. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output unit 612 allows for input and output of data with other devices that may be connected to data processing system 600. For example, input/output unit 612 may provide a connection for user input through a keyboard, a mouse, and/or some other suitable input device. Further, input/output unit 612 may send output to a printer. Display 614 provides a mechanism to display information to a user.

Instructions for the operating system, applications, and/or programs may be located in storage devices 616, which are in communication with processor unit 604 through communications fabric 602. In these illustrative examples, the instructions are in a functional form on persistent storage 608. These instructions may be loaded into memory 606 or run by processor unit 604. The processes of the different embodiments may be performed by processor unit 604 using computer implemented instructions, which may be located in a memory, such as memory 606.

These instructions are referred to as program code, computer usable program code, or computer readable program code that may be read and run by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 and run by processor unit 604. Program code 618 and computer readable media 620 form computer program product 622 in these examples. In one example, computer readable media 620 may be computer readable storage media 624 or computer readable signal media 626. Computer readable storage media 624 may include storage devices, such as, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage device, such as a hard drive, a thumb drive, or a flash memory, that is connected to data processing system 600. In some instances, computer readable storage media 624 may not be removable from data processing system 600. In these illustrative examples, computer readable storage media 624 is a non-transitory computer readable storage medium.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing program code 618 may be a server computer, a client computer, or some other device capable of storing and transmitting program code 618.

Program code 618 may be downloaded over a network from a remote data processing system to computer readable storage media 624 in data processing system 600. Furthermore, data processing system 600 may be a server data processing system, and program code 618 may be downloaded over the network to the remote data processing system for use in another computer readable storage media in the remote data processing system.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 600 is any hardware apparatus that may store data. Memory 606, persistent storage 608, and computer readable media 620 are examples of storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 606, or a cache, such as found in an interface and memory controller hub that may be present in communications fabric 602.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the invention is a method, data processing system, and computer program product for sharing displayed content. A content displayed on a source computer system is shared with a set of target computer systems, wherein the content is displayed on a target display on each target computer system in the set of target computer systems. In response to a change in the content displayed on the source computer system, a progress in displaying the change in the content on the target display on the each target computer system in the set of target computer systems is identified. An indication of the progress in displaying the change in the content on the target display on the each target computer system in the set of target computer systems is generated at the source computer system.

One or more of the illustrative embodiments share content displayed on a source computer system with a set of target computer systems. The illustrative embodiments may provide an effective process for indicating an amount of progress in displaying the content on each of the set of target computer systems. These results may save time because presenters and users at a source computer system do not have to spend making phone calls and sending messages to find out the status of displaying the content on each target computer system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data processing computer system for customizing a presentation comprising:
   a bus;
   a communications unit connected to the bus;
   a storage device connected to the bus, wherein the storage device stores program code; and
   a processor unit connected to the bus, wherein the processor unit is configured to run the program code to:
   share a content displayed on a source computer system with a set of target computer systems, wherein the content is displayed on a target display on each target computer system in the set of target computer systems;
   responsive to a change in the content displayed on the source computer system, identify a progress in displaying the change in the content on the target display on the each target computer system in the set of target computer systems, wherein the change in the content displayed on the source computer system is a difference between the content displayed at a current time as compared to the content displayed at a previous time, and wherein the each target computer system receives, and begins to display, the change in the content on a respective target display;
   generate an indication of the progress since beginning to display the change in the content until the change in the content is actually displayed as complete on the target display on the each target computer system in the set of target computer systems at the source computer system, wherein the progress in displaying the change in the content on the target display for the each target computer system is monitored and compared with the progress in displaying the change in the content of each other target computer system in the set of target computer systems; and
   display the indication of the progress in displaying the change in the content on the target display on the each target computer system in the set of target computer systems on a source display on the source computer system.

2. The data processing computer system of claim 1, wherein the processor unit is further configured to run the program code to display the indication of the progress in displaying the change in the content on the target display on the each target computer system in the set of target computer systems on a target display in the set of target computer systems.

3. The data processing computer system of claim 1, wherein the processor unit is further configured to run the program code to display the indication of the progress in displaying the change in the content on a target display on a target computer system in the set of target computer systems on the target display on the target computer system.

4. The data processing computer system of claim 1, wherein in being configured to run the program code to identify the progress in displaying the change in the content on the target display on the each target computer system in the set of target computer systems, the processor unit is configured to run the program code to identify an expected amount of time until the change in the content on a target display on a target computer system in the set of target computer systems is displayed.

5. The data processing computer system of claim 1, wherein the processor unit is further configured to run the program code to determine a set of actions that are required to display the change in the content on a target display on a target computer system in the set of target computer systems within a specified amount of time and display the set of actions on the source computer system.

6. A computer program product for customizing a presentation comprising:
   a computer readable storage medium;

program code, stored on the computer readable storage medium, for sharing a content displayed on a source computer system with a set of target computer systems, wherein the content is displayed on a target display on each target computer system in the set of target computer systems;

program code, stored on the computer readable storage medium, responsive to a change in the content displayed on the source computer system, for identifying a progress in displaying the change in the content on the target display on the each target computer system in the set of target computer systems, wherein the change in the content displayed on the source computer system is a difference between the content displayed at a current time as compared to the content displayed at a previous time, and wherein the each target computer system receives and begins to display the change in the content on a respective target display;

program code, stored on the computer readable storage medium, for generating an indication of the progress since beginning to display the change in the content until the change in the content is actually displayed as complete on the target display on the each target computer system in the set of target computer systems at the source computer system, wherein the progress in displaying the change in the content on the target display for the each target computer system is monitored and compared with the progress in displaying the change in the content of each other target computer system in the set of target computer systems; and program code, stored on the computer readable storage medium, for displaying the indication of the progress in displaying the change in the content on the target display on the each target computer system in the set of target computer systems on a source display on the source computer system.

7. The computer program product of claim 6, further comprising program code, stored on the computer readable storage medium, for displaying the indication of the progress in displaying the change in the content on the target display on the each target computer system in the set of target computer systems on a target display in the set of target computer systems.

8. The computer program product of claim 6, wherein the program code, stored on the computer readable storage medium, for identifying the progress in displaying the change in the content on the target display on the each target computer system in the set of target computer systems further comprises program code, stored on the computer readable storage medium, for identifying an expected amount of time until the change in the content on a target display on a target computer system in the set of target computer systems is displayed.

9. The computer program product of claim 6, further comprising program code, stored on the computer readable storage medium, for determining a set of actions that are required to display the change in the content on a target display on a target computer system in the set of target computer systems within a specified amount of time and displaying the set of actions on the source computer system.

* * * * *